3,366,467
RADIATION PROCESS OF DEFORMING GLASS
FIBER MATERIALS
Shunji Ohnishi, Shinjuku-ku, Tokyo, and Hiroshi Tsuboi,
Suginami-ku, Tokyo, Japan, assignors to Agency of
Industrial Science & Technology, Tokyo, Japan, a corporation of Japan
No Drawing. Filed Feb. 3, 1964, Ser. No. 342,259
Claims priority, application Japan, Feb. 6, 1963,
38/4,703
2 Claims. (Cl. 65—2)

ABSTRACT OF THE DISCLOSURE

A process for permanently setting glass fiber material into a desired shape retaining high strength characteristics by preforming an inorganic high polymer glass fiber material, such as that usually made from glass, quartz, or rocks, into a desired shape and then exposing it to a sufficient quantity if ionizing radiation, which radiation permanently sets the material without changing the chemical structure or strength characteristics thereof.

The present invention relates to a process for deformation of glass fiber material, in general, and to a process wherein glass fibers or the like are permanently deformed by means of irradiation with radioactive rays, in particular.

Heretofore it has been considered that the permanent deformation of glass fiber material, without loss of mechanical strength could not be achieved.

It is one object of the present invention to provide a process for achieving a deformation of glass fibers by which any desired form, such as twisting, curling, bending, etc., of the glass fiber material can be permanently provided, by exposure to radioactive rays.

It is another object of the present invention to provide a novel process wherein glass fibers are easily and readily deformed, as desired, by simply exposing glass fibers to radioactive rays which initially set in a desired form.

It is yet another object of the present invention to provide a process for deforming glass fibers which offers superior spinning and bulk properties for the deformed glass fibers.

The glass fibers or the like specified herein in the present invention, have the following chemical formula:

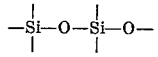

The basic material thereof is principally based on an inorganic high polymer in which there may be contained various metallic elements in atomic-compound form. Such a basic material is usually obtained from glass, quartz and rock after being made into fibrous shape. Further, the applicable radioactive rays used in the process of the present invention are γ-rays and X-rays having an ionization property, as well as β, and α-rays, neutron beams and molecular beams also having ionization power.

The principle relied upon in the present invention is the effect of radioactive rays on materials, which causes a physical change thereof.

Presently it is impossible to satisfactorily deform glass fiber materials by mechanical means due to the lack of a necessary plasticity characteristic thereof. In the event glass fibers are heated to temperatures where the material exhibits sufficient plasticity for a proposed deformation, the molecular composition is easily destroyed.

With fibers based on usual organic high polymers, any deformation, such as twisting, curling, bending, etc. can be realized utilizing a heat treatment without any change in the mechanical properties thereof, which is not the case with glass fibers based on inorganic high polymers. These different characteristic properties of the above-mentioned two materials are based upon their respective different molecular arrangements, namely, an organic high polymer is usually composed of two portions, one, a crystallizing part and, two, a non-crystallizing part, and an active molecular movement of the non-crystallizing part may be expected in the thermal range between the softening point and the melting point. No molecular movement is generated in the crystallizing part. Consequently, the molecules in the non-crystallizing part are accordingly arranged along a direction generating an inner-stress whereby deformation can be provided, and additionally the mechanical strength would not be affected.

When preformed glass fibers are treated with an irradiation of radioactive rays, no chemical changes occur. However, physical effects do occur, such as a transfer of atoms to the locus on which a radioactive ray has passed, and a local heating phenomenon also occurs due to the energy generated when the high energy particles are absorbed.

The physical effects from the irradiation by the radioactive rays above-mentioned, namely, the transfer of atoms and the heating phenomemon, do not occur uniformly throughout the material but occur locally.

Consequently, if the radioactive rays are applied on a preformed state, the heat-movement intensely increases so that the molecules are arranged in the direction where all inner stress disappears.

Now, because of its local molecular movement, glass fibers, in accordance with the present invention, are able to be permanently deformed without losing its original fibrous state and mechanical properties.

Since these physical effects are expected from the action of high energy particles such as high speed electrons generated in the reaction between the materials and the electromagnetic radioactive rays, the exact same physical effects can be expected regardless of the kind of rays.

Example 1

60 pcs. of glass fibers in denier 2 were bundled and given 600–700 twists per meter by means of a twist counter.

The bundle was set in a bobbin made of paper, being kept in the twisted condition.

The glass fiber material so bundled together was treated by an irradiation of $2 \times 10^7$ r. (rontgens) by employing γ-rays of cobalt 60. After the treatment, it was discovered that 60–70 of the residual twists per meter were presented which far exceeds the number when radioactive rays are not applied.

Example 2

20 pcs. of glass fibers in denier 2 were bundled and given 600–700 twists per meter by means of a twist counter.

The bundle was set in a bobbin made of paper, being kept in the twisted condition.

The glass fibrous materials so bundled together was treated by an irradiation of $4 \times 10^7$ r. by employing γ-rays of cobalt 60.

After the treatment, it was discovered that 300–400 of the residual twists per meter were presented.

Example 3

Glass fiber in approximately denier 2 was fixed between two wave formed plates (one wave form per millimeter) made of plastic and irradiated with γ-ray of cobalt 60 of $4 \times 10^7$ r. It was found that one perpetual wave form per millimeter was respectively presented.

Example 4

60 pcs. of glass fibers of approximately 5 microns in diameter were bundled together and wound around a steel wire of 0.8 millimeter in diameter imparting 20 grams of tension in the non-twisting state.

Then the glass fibers were irradiated by $2 \times 10^7$ r. using γ-ray of cobalt 60 at a temperature range between 80° C. and normal temperatures. The bundle was then detached from the wire and had a spiral form of 5–2 millimeters in diameter.

Such deformations could not occur from a non-irradiation treatment.

While we have disclosed several embodiments of the present invention, it is to be understood that these embodiments are given by example only and not in a limiting sense, the scope of the present invention being determined by the objects and the claims.

What we claim is:

1. A process for permanently setting glass fiber materials in a preformed shape comprising the steps of selecting a glass fiber material of

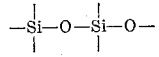

the basic material thereof principally based on an inorganic high polymer, preforming said glass fiber material into a predetermined shape, and exposing said preformed glass fiber material to a sufficient dosage of high energy ionizing radiation until said preformed glass fiber material sets, thereby producing a chemically unchanged fibrous material permanently set in substantially said predetermined shape and having substantially its original physical strength properties.

2. The process, as set forth in claim 1, wherein said dosage of high energy ionizing radiation is substantially within the range of $2 \times 10^7$ to $4 \times 10^7$ r. of γ-rays.

References Cited

UNITED STATES PATENTS 2,746,193  5/1956  Billian _____ 65—111
3,097,960  7/1963  Lawton et al. _____ 65—111

FOREIGN PATENTS 752,243  7/1956  Great Britain.

DONALL H. SYLVESTER, *Primary Examiner.*

HOWARD S. WILLIAMS, *Examiner.*

G. R. MYERS, *Assistant Examiner.*